United States Patent [19]
Ando et al.

[11] Patent Number: 5,475,849
[45] Date of Patent: Dec. 12, 1995

[54] MEMORY CONTROL DEVICE WITH VECTOR PROCESSORS AND A SCALAR PROCESSOR

[75] Inventors: Toshimitsu Ando, Hadano; Tsuguo Matsuura; Tadaaki Isobe, both of Kanagawa, all of Japan

[73] Assignee: Hitachi, Ltd.

[21] Appl. No.: 846,147

[22] Filed: Apr. 6, 1992

Related U.S. Application Data

[63] Continuation of Ser. No. 362,260, Jun. 6, 1989, abandoned.

[30] Foreign Application Priority Data

Jun. 17, 1988 [JP] Japan .................................. 63-149446

[51] Int. Cl.[6] .................................................. G06F 15/16
[52] U.S. Cl. .................... 395/800; 364/DIG. 1; 364/232.21; 364/239
[58] Field of Search ................. 395/800, 425, 395/400, 250, 700

[56] References Cited

U.S. PATENT DOCUMENTS

| | | | |
|---|---|---|---|
| 3,581,291 | 5/1971 | Iwamoto et al. | 364/200 |
| 3,588,829 | 6/1971 | Boland et al. | 364/200 |
| 3,618,041 | 11/1971 | Horikoshi | 364/200 |
| 3,735,360 | 5/1973 | Anderson et al. | 364/200 |
| 4,056,844 | 11/1977 | Izumi | 364/200 |
| 4,142,234 | 2/1979 | Bean et al. | 364/200 |
| 4,785,398 | 11/1988 | Joyce et al. | 364/200 |
| 4,819,154 | 4/1989 | Stiffler et al. | 364/200 |

OTHER PUBLICATIONS

Censier, Lucien M., et al. "A New Solution to Coherence Problems in Multicache Systems," IEEE Transactions on Computers, vol. C-27, No. 12, Dec. 1978, pp. 1112–1118. (provided in English).

*Primary Examiner*—Kevin A. Kriess
*Attorney, Agent, or Firm*—Fay, Sharpe, Beall, Fagan, Minnich & McKee

[57] ABSTRACT

A memory control unit connected to a scalar processor having a buffer for storing a copy of block data of a main storage and a vector processor having a store requester for writing data into the main storage is disclosed. The memory control unit has a block valid memory having a one-bit valid bit for all blocks. The valid bit represents that the copy of the block data corresponding to said bit is in the buffer of the scalar processor. The memory control unit further has a block group valid table which has a block group bit for each block group. The block group bit represents whether any one of the block valid bits of the block belonging to the corresponding group is valid or not. When the vector processor stores the data into the main storage by the store requester, the memory control unit first searches the block group valid table to check whether the block group valid bit of the block group including the store address is valid or not. If it is valid, the memory control unit further searches the block valid memory to check whether the block valid bit of the block including the store address is valid or not. If it is valid, it invalidates the buffer of the scalar processor.

15 Claims, 6 Drawing Sheets

MEMORY CONTROL DEVICE WITH VECTOR PROCESSORS AND A SCALAR PROCESSOR

This is a continuation of application Ser. No. 07/362,260 filed on Jun. 6, 1989, now abandoned.

BACKGROUND OF THE INVENTION

The present invention relates to a storage control system, and more particularly to a matching control system of a main storage and a buffer storage in a vector processor.

In a prior art computer system, a copy of a main storage (hereinafter MS) is stored in a buffer storage or cache (hereinafter BS) which is constructed of faster elements than those of the MS. Therefore, processor can more rapidly access the BS.

In a multi-processing system in which a plurality of instruction processors, each having a BS, share one MS, a matching control between the MS and the BS is effected when a store operation is performed from an instruction processor to the MS, in a manner described in U.S. Pat. No. 4,056,844 (JP-B-54-40182). In this system, a front address array (hereinafter FAA) is provided in the BS separately and independently from a buffer address array (hereinafter BAA) in which an address in the MS is registered. The FAA is a management table referenced by other processors for checking the store address, and serves to rapidly perform the matching control between the MS and the BS. In U.S. Pat. No. 4,056,844, the BAA is designated as BAA-1 or BAA11, and the FAA is designated as BAA2 or BAA12.

A vector processor (hereinafter VP) is used to rapidly perform scientific and technical operations. The VP comprises a plurality of vector registers (hereinafter VR's) for holding vector data and a plurality of operation units for operating on the vector data. In many cases, an element parallel system, in which vector data to be processed by one vector instruction is divided into a plurality of groups and the operations are performed in parallel in the respective groups, is adopted. In such cases, when the VP accesses the MS, it is allocated to a plurality of requesters (which access the MS and transfer data between the MS and the VR) in parallel for the divided element groups.

For a multi-processor of a super computer comprising a plurality of VP's, a plurality of scalar processors (hereinafter SP's) for performing a scalar operation and set-up operation for the VP's a BS in each SP, and the MS shared by the VP's and the SP's, no consideration has been given, in the past, to the matching control between the MS and the BS. Accordingly, the following problem has occurred in the multi-processor of the super computer.

When the store operation is performed from the VP to the MS, if the FAA for checking the store address is provided as means for effecting the matching control between the MS and the BS, substantial decrease of throughput of a store request due to waiting for FAA retrieval is unavoidable because the VP's in parallel, issue a plurality of store requests. If a plurality of FAA's are provided to comply with the store requests of the VP's, the hardware significantly increases and the device will be occupied and dominated by the FAA's.

SUMMARY OF THE INVENTION

It is an object of the present invention to provide a storage control system which can efficiently effect the matching control between the MS and the BS with a small number of FAA's in the multi-processor system of the super computer comprising a plurality of VP's having a plurality of store requesters, a plurality of SP's each having a BS, and a MS shared by the VP's and the SP's.

In accordance with the storage control system of the present invention, in the multi-processing system comprising a plurality of VP's each having a store requester to the main storage, and a plurality of SP's each having a BS which stores a copy of the main storage and which has a management table having an address of the store copy in the main storage register in the BS, the main storage is divided into blocks corresponding to storage units of the BS, and a block valid memory, (hereinafter BVM) which indicates whether a block on the MS is present in the BS, is provided. The BVM contains block valid bits (hereinafter BV's) corresponding to each block. A BV is valid when the corresponding block is in the BS. When the store operation is performed to the main storage from the VP, the BVM is referenced before the management table is referenced so that the matching control between the MS and the BS is effected. The BVM has a circuit in its input circuit in order to reduce the request having a plurality of continuous store addresses, contained in the same block, to one request. Further, the MS is divided into groups, each group comprising a plurality of blocks which are storage units of the BS. A block group valid table (hereinafter BGVT), for indicating whether a portion or all of the blocks in each group are present in the BS, is also provided. The BGVT includes block group valid bits (hereinafter BGV) provided one for each block group, and each BGV bit is valid when at least one of the blocks in the corresponding group block is present in the BS. When the store operation is performed to the MS from the VP, the BGVT is referenced before the BVM is referenced.

In the present invention, the MS is divided into blocks which are storage units of the BS. The BVM, which indicates whether the blocks on the MS are present in the BS, is provided for each of the SP's. When the store request is issued from the VP, the store address is checked by the BVM before the FAA is accessed, and the FAA is accessed only when the BV for the block including the store address is valid. As a result, the access is started after the presence of the store address in the FAA has been confirmed. Thus, the number of accesses is decreased and a waiting time is reduced with a small number of FAA's. The BVM's are interleaved in a plurality of banks so that each can operate independently. As a result, the waiting time is further reduced.

At the input of the BVM, the store addresses of the store requests simultaneously issued by the plurality of requesters are compared. The store addresses of the store requests in the time axis direction of the VP are also compared determine whether the store requests are to the same block of the BS. The store requests to the same block are then packed into one request. Thus, the number of times of access can be reduced.

The MS is divided into groups, each having a plurality of blocks which are storage units of the BS. The BGVT, which indicates whether a portion or all of the blocks in the groups on the MS are present in the BS, is provided for each store requester in the VP. When the store request is issued from the VP, the store address is checked by the BGVT before the BVM is accessed, and the BVM is accessed only when the BGV for the block group including the store address is valid. As a result, the access to the BVM is reduced and the waiting time is shortened.

BRIEF DESCRIPTION OF THE DRAWINGS

The invention may take physical form in certain parts and arrangements of parts which will be described in detail in this specification and illustrated in the accompanying drawings which form a part of the specification hereof and wherein.

DESCRIPTION OF THE PREFERRED EMBODIMENTS

A principle and embodiments of the present invention are now explained in detail with reference to the drawings.

First Embodiment

Figure 1:
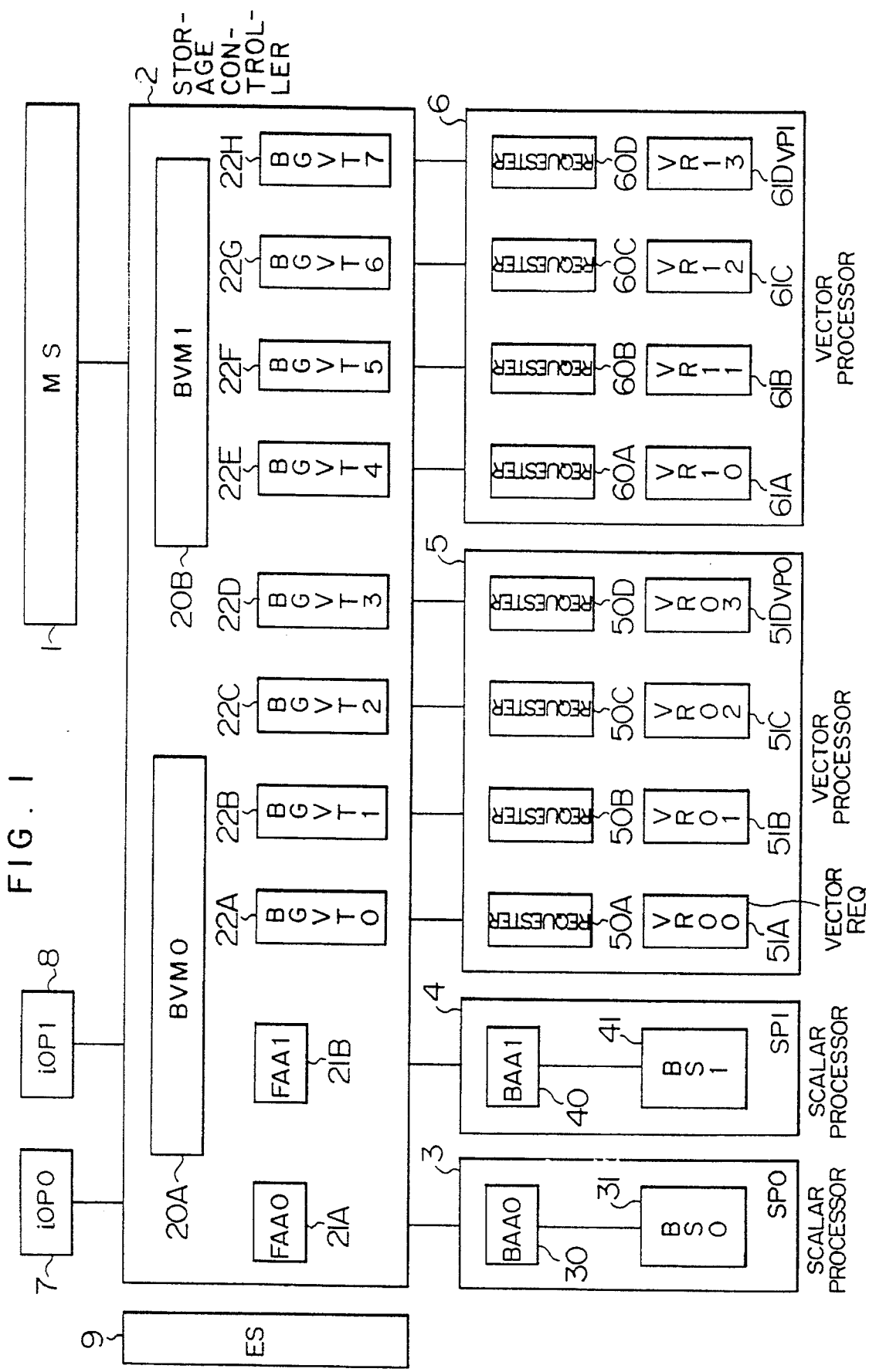
FIG. 1 shows a configuration of a multi-processor system of a super computer including a storage control unit, in accordance with one embodiment of the present invention.

Shown in FIG. 1 are an MS 1 which is shared by a plurality of SP's 3 and 4 and a plurality of VP's 5 and 6, I/O processors (hereinafter IOP's) 7 and 8, an extended storage (hereinafter ES) 9, and a storage controller (hereinafter SC) 2 for controlling requests to the MS 1 from the SP's 3 and 4, the VP's 5 and 6, the IOP's 7 and 8 and the ES 9.

The SP's 3 and 4 include BS's 31 and 41, and BAA's 30 and 40 for registering addresses of the BS's 31 and 41 in the MS 1, respectively.

The VP's 5 and 6 include VR's 51A–51D and VR's 61A–61D, and store requestors 50A–50D and 60A–60D for the MS 1, respectively. The VR's 51A–61D serve to store copies of the vector data of the MS 1 and have the same functions as those of the BS's 31 and 41 in the SP's 3 and 4.

The VP's 5 and 6 perform the operation in a parallel-by-element fashion. For example, if a store instruction to store the data of the VR 51A into a continuous area in the MS 1 is issued by the VP 5, the data of the VR's 51A–51D are divided by element into four elements, and they are allocated to the four requestors such that the first element is allocated to the requester 50A, the second element is allocated to the requester 50B and so on (parallel-by-element fashion). The requestors 50A–50D issue the store requests to the MS 1, respectively.

The SC 2 contains the FAA 21A or 21B, which is a copy of the BAA's 30 and 40, the BVM's 20A and 20B, which indicate whether the block on the MS 1 is present in the BS's 31 and 41, and the BGVT's 22A–22H which indicate whether a portion or all of the blocks in the block group on the MS 1 are present in the BS 31 or 41. They are provided one set for each of the store requestors 50A–50D and 60A–60D of the VP's 5 and 6.

When the store instruction of the VP 5 is issued, the vector store data is divided and allocated to the store requestors 50A–50D in the parallel-by-element fashion. The store request addresses issued by the store requestors 50A–50D are first checked by the BGVT's 22A–22D. As described above, the BGVT's 22A–22D are tables which have one-bit BGV for each group of the blocks of the BS's 31 and 41, for example, for each segment (1048576 bytes) or page (4096 bytes). The number of entries thereof corresponds to the capacity of the MS 1. The BGVT's 22A–22D are provided one for each of the store requestors 50A–50D (four BGVT's in the present embodiment). When the store request is issued, the BGV of the block group included in the store address is checked. If the BGV is valid, that is, if BGV="1", the store request is sent to the BVM's 20A and 20B. When it is invalid, that is, when BGV="0", it is ignored and not sent to request the BVM's 20A and 20B.

The store addresses associated with the BVM requests issued from the BGVT's 22A–22D are supplied to a circuit (which is to be described later) for comparing the store addresses simultaneously sent from the BGVT's 22A–22D, respectively, and checked whether they are store requests to the same block in the BS's 31 and 41. The BVM requests to the same block are reduced into one BVM request. This will be explained later with reference to FIG. 3.

The BVM requests from the BGVT's 22A–22D which have been reduced by the circuit are then supplied to the other circuit (which is to be described later) for comparing the store addresses along a time axis. Like the compare circuit for the parallel-by-element direction, the compare circuit for the time axis direction checks whether the requests are the BVM requests for the same block in the BS's 31 and 41. The BVM requests for the same block are reduced to one BVM request, and then the BVM's 20A and 20B are accessed.

The BVM's 20A and 20B are memories which have one-bit BV for each block of the BS's 31 and 41. They are provided one for each of the BS's 31 and 41 in the system. For example, in a system which comprises the SP 3 having the BS 31 and the SP 4 having the BS 41, two BVM's 20A and 20B are provided. The numbers of entries of the BVM's 20A and 20B correspond to the number of all of the blocks in the MS 1, respectively. The BVM's 20A and 20B are interleaved in a plurality of banks, respectively, so that they can continuously handle the requests to the BVM's 20A and 20B. The BVM's 20A and 20B check the BV's of the blocks contained in the store addresses of the simultaneously inputted BVM requests, and if it is valid, that is, if BV="1", the request is transferred to the corresponding FAA 21A or 21B, and if it is invalid, that is, if BV="0", the request is ignored and not sent to the corresponding FAA 21A or 21B. The request sent to the FAA searches the FAA 21A or 21B to check the store address. If the store address is present in the FAA 21A or 21B, that is, if the data of the BS 31 or 41 is to be rewritten by the store request of the VP 5 or 6, the block in the BS 31 or 41 is invalidated to effect the matching control between the MS and the BS.

The registration and invalidation of the valid bits of the BGVT's 22A–22H and the BVM's 20A and 20B are effected when the data is registered or validated in the BS in synchronism with the registration and invalidation of the addresses of the BS's 31 and 41 in the MS for the FAA's 21A and 21B. When the request to register the data of the MS 1 into the BS 31 or 41 is issued, the address of the BS in the MS is registered into the entry of the FAA 21A or 21B corresponding to the block of the BS, and the entire BVM 20A or 20B in the system is read one block group at a time for the BGVT's 22A–22H including the block under consideration. For example, if a block comprises 128 bytes and the block group comprises 1048576 bytes, the BV of the 8192 entries including the block is read.

Then, the valid bit is registered to the entry of the BVM corresponding to the block. That is, BV is set to "1" and the BV's of the 8192 entries including the block are examined. If all BV's of the all BVM's in the system are "0", that is, if the BGV of the BGVT corresponding to the block group is "0" before the request for the registration of the FAA, a valid bit is registered to the entry of all BGVT's corresponding to the block group. That is, the BGV is set to "1". If at least one of the BV's of the all BVM's in the system of the 8192 entries including the block is "1", that is, if the BGV of the BGVT corresponding to the block group is "1" before the request of registration of the FAA, no registration is required for the BGVT and hence the BGVT is not accessed. The invalidation of the valid bits of the BGVT and the BVM is effected in the same manner as the registration. Namely, when the data of the BS 31 or 41 is rewritten by the store request to the MS 1 from other processor such as the VP or the SP, the block of the BS and the entry of the FAA are invalidated, and the entry to the block of the BVM is invalidated, that is, the BV is set to "0". Then, the BV's of the 8192 entries of all BVM's in the system including the block are read, and the BV's of the 8192 entries of all BVM's in the system are examined. If all BV's are "0", that is, if all blocks of the block group are invalid due to the store request from other processor, the entries of all BGVT's for the block group are invalidated, that is, the BGV is set to "0". If at least one of the BV's of the 8192 entries of all BVM's in the system is "1", there is no need to invalidate the entry of the BGVT and hence the BGVT is not accessed. In this manner, the matching control to the FAA, the BVM and the BGVT is effected and the matching control between the MS 1 and the BS's 31 and 41 is attained.

Figure 2:
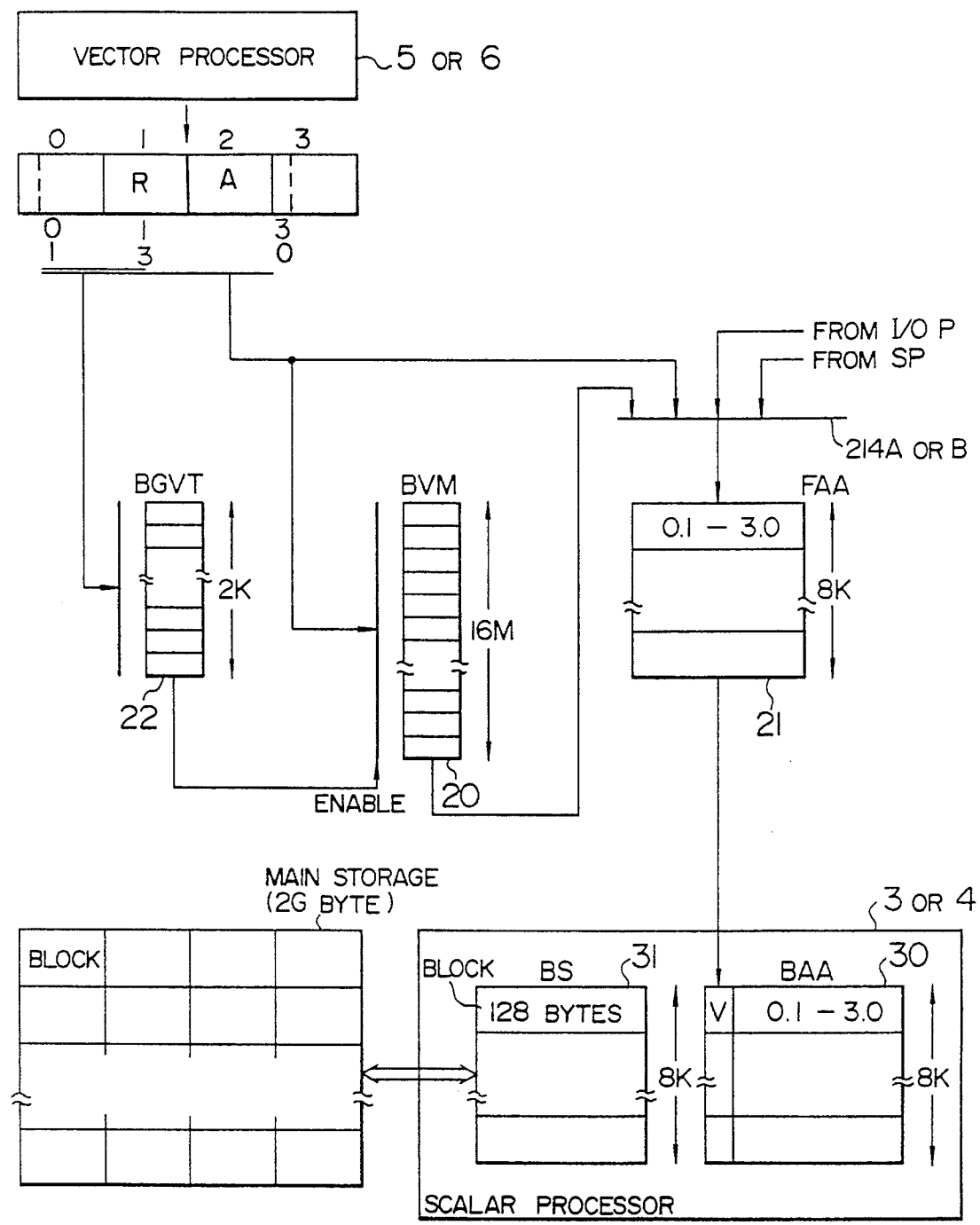
FIG. 2 shows address relationship of a main storage (MS), a BGVT, a BVM and an FAA in the system of FIG. 1.

FIG. 2 shows a schematic view which illustrates an address relationship among the MS 1, the VP 5 (or 6), the SP 3 (or 4), the BGVT 22, the BVM 20 and the FAA 21. For simplification purpose, not all of the components in FIG. 1 are shown in FIG. 2.

The VP 5 generates a 4-byte (31 bits) real address. It is an address on the MS 1 (which has a capacity of $2^{31}$ bytes (2 G bytes)). High order 11 bits (0.1–1.3) of the generated real address are supplied to the BGVT 22 (the most significant bit is not used). As described above, the BGVT 22 has the 2K ($2^{11}$) BGV's, one of which is read by the high order 11 bits of the real address.

When the BGV read is "1", there is a possibility that a block in the block group corresponding to that BGV has been registered in the BS 3 (or 4). Therefore, the BVM 20 is referenced.

High order 24 bits (0.1–3.0) of the real address from the VP 5 are supplied to the BVM 20. As described above, the BVM 20 has 16M ($2^{24}$) BV's, one of which is read.

If the BV read is "1", it means that the block corresponding to that BV has been registered in the BS 3 (or 4). If the BV is "1", it is determined, without searching the FAA 31, that the block corresponding to that BV has been registered in the BS 3 (or 4). Accordingly, if the BV is "1", the block of the BS 3 may be cancelled without searching the FAA 31. However, since this requires an additional path of invalidation for the BAA and makes the matching control between the FAA 31 and the BAA 30 complex, the BV read from the BVM is not used for the invalidation of the BAA 30 but the real address from the VP 5 (or 6) is supplied to the FAA 21 as a selection signal to the selector 214A or 214B for searching. The address from other requester (for example, IOP) is also supplied to the selector 214A or 214B.

If the matching is detected in the FAA 21, the valid bit of the entry corresponding to that block in the BAA 30 is reset to "0" in order to invalidate the block in the BS 31.

Figure 3:
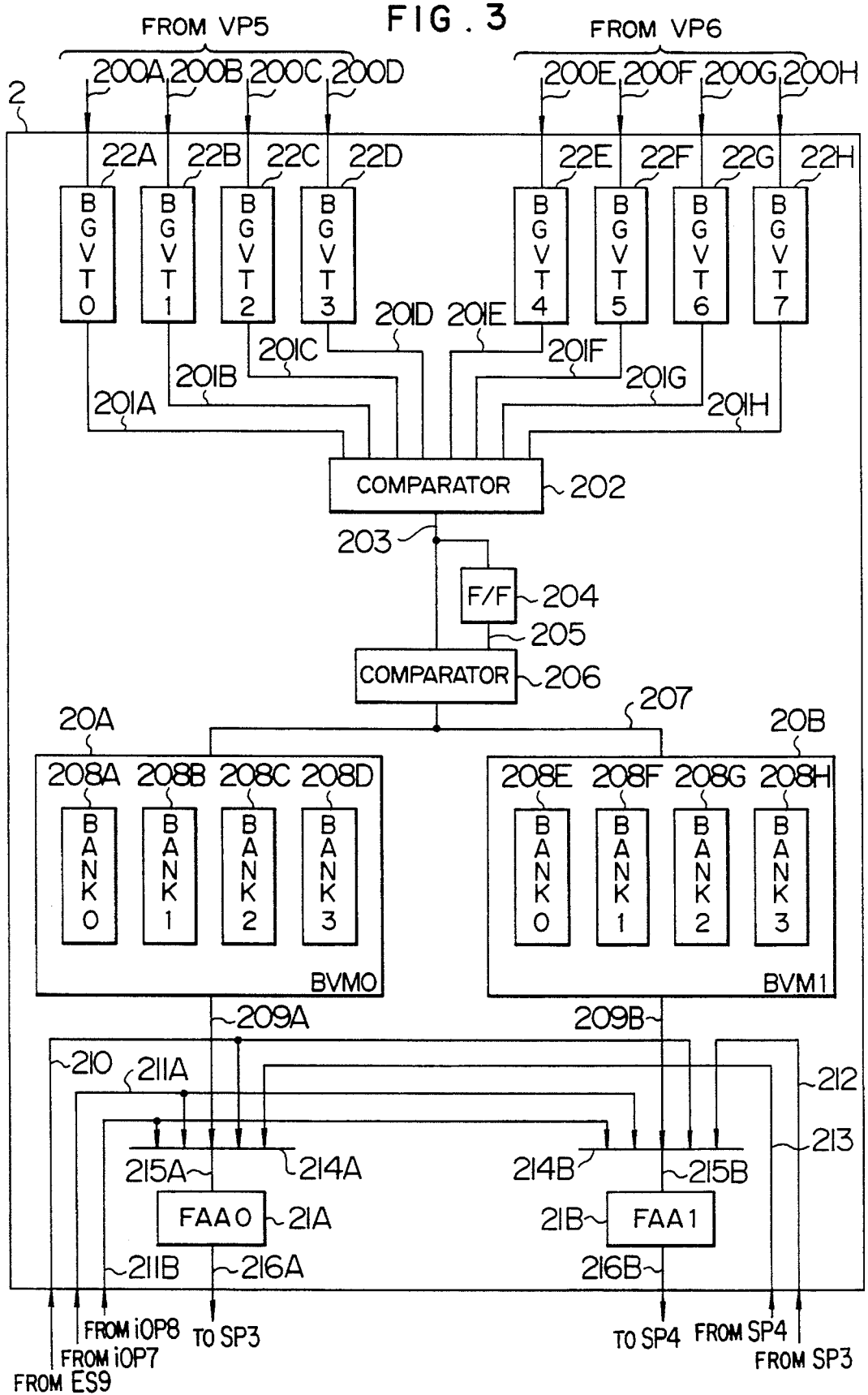
FIG. 3 illustrates an operation of the BGVT and the BVM when a store request of a VP is issued.

FIG. 3 illustrates an operation of the BGVT and the BVM when the store request is issued by the VP in FIG. 1.

The operation of the matching control between the MS 1 and the BS's 31 and 32 when the store requests (with the store addresses) are issued from the VP's 5 and 6 is explained with reference to FIG. 3.

The store requests (with store addresses) 200A–200H issued by the store requesters 50A–50D and 60A–60D of the VP's 5 and 6 are accepted by the SC 2 and supplied to the corresponding BGVT's 22A–22H. As described above, the BGVT's 22A–22H are tables which have one-bit BGV for each $2^{20}$-byte group (block group), and read the BGV's of the block groups including the store addresses associated with the store requests. When the BGV is "1", that is, when there is a possibility that the data of the BS is rewritten by the store request, the store request is used as the requests (with store addresses) 201A–201H to the compare circuit 202. If the BGV is "0", that is, if there is no possibility that the data of the BS is rewritten by the store request, the store request is terminated without issuing the request to the compare circuit 202. The store request, however, performs the store operation for the MS 1 although there is no need to access the BVM's 20A and 20B.

The compare circuit 202 serves to reduce the store requests (with the store addresses) 201A–201H simultaneously issued from the BGVT's 22A–22H. The compare circuit 202 compares the store addresses of the input store requests (with the store addresses) 201A–201H, and if there are a plurality of requests to the same block, it reduces them to one request. The requests (with the store addresses) reduced by the compare circuits 202 are supplied to the compare circuit 206 and the flip-flop 204. The compare circuit 206 and the flip-flop 204 serve to further reduce, along the time axis, the requests 203 which have been reduced along the elements. The flip-flop 204 serves to temporarily hold the requests (with the store addresses) 203. If the requests (with the store addresses) are continuously issued, the first request is held in the flip-flop 204 and also passes through the compare circuit 206 and is used as the request (with the store address) 207 to access the BVM's 20A and 20B. Then, the second request is held in the flip-flop 204 and supplied to the compare circuit 206, and the first request held in the flip-flop 204 is used as the request 205 for the compare circuit 206. Like the compare circuit 202, the compare circuit 206 compares the addresses of the requests (with the store addresses) 203 and 205, and if there are requests for the same block of the BS 31, it reduces them to one request. For the third and subsequent requests, the continuous store addresses are sequentially reduced along the time axis in the same manner. In this manner, the requests (with the store addresses) which passed through the BGVT's 22A–22H are reduced along the elements and along the time axis, and are used as the requests (with the store addresses) 207 for the BVM's 20A and 20B.

Since the data store from the VP usually includes the continuous store addresses, the number of times of search of the BVM 20A and 20B can be significantly reduced by the reduction of the requests.

The BVM's 20A and 20B are memories which have one-bit BV for each block of the BS. As described above, each comprises 16,777,216 entries. The BVM 20A corresponds to the BS 31 in the SP 3, and the BVM 20B corresponds to the BS 41 in the SP 4. The BV of the BVM 20A or 20B corresponding to the valid block in the BS 31 or 41 is "1". The BVM's 20A and 20B are interleaved in the four banks 208A–208D and 208E–208H respectively. When the requests (with the store addresses) 207 for the BVM's 20A and 20B are issued, the BVM's 20A and 20B read the BV's of the entries corresponding to the store addresses. When the BV is "1", that is, when the data of the BS 31 or 41 is to be rewritten by the store request, the request (with the store addresses) 209A or 209B for the FAA 21A or 21B for the corresponding BVM is issued. When the BV is "0", that is, when the data of the BS is not to be rewritten by the store request, the request 209A or 209B for the FAA 21A or 21B for the corresponding BVM is not issued and the request is terminated. Since the BVM's 20A and 20B are of larger capacity than the BGVT's 22A–22H, they are constructed by memories which are of higher density but lower speed than the BGVT's 22A–22H. (For example, four 4M DRAM LSI's.) Accordingly, they are interleaved in four banks 208A–208D and 208E–208H, respectively, and can continuously handle the requests to the BVM's. The request 209A or 209B from the BVM 20A or 20B is supplied to the selector 214A or 214B, together with the store request 210 from the ES 9, the store request 211A or 211B from the IOP 7 or 8, and the store request 212 or 213 from the SP 3 or 4. The selectors 214A and 214B prioritize the requests, and the selected request 215A or 215B accesses the FAA 21A or 21B. Since both of the FAA's 21A and 21B are to be accessed, the requests 210, 211A and 211B of the ES 9, and the IOP's 7 and 8 are supplied to both of the selectors 214A and 214B. On the other hand, the request of the SP 3 is to request the store operation to the BS 31 in the SP 3 and hence it does not request to access to the FAA 21 corresponding to the BS 31 but it only need to check whether the data of the BS 4 in the SP 4 has been rewritten. Accordingly, the request of the SP 3 is supplied only to the selector 214B for the FAA 21B corresponding to the BS 41. The FAA 21A or 21B checks the request address of the store request selected by the selector 214A or 214B, and when the request address matches the address of the data registered in the BS 31 or 41, that is, when the data of the BS 31 or 41 is to be rewritten by the store request, the FAA 21A or 21B issues the invalidation request 216A or 216B of the entry of the BS to the SP 3 or 4.

Figure 4:
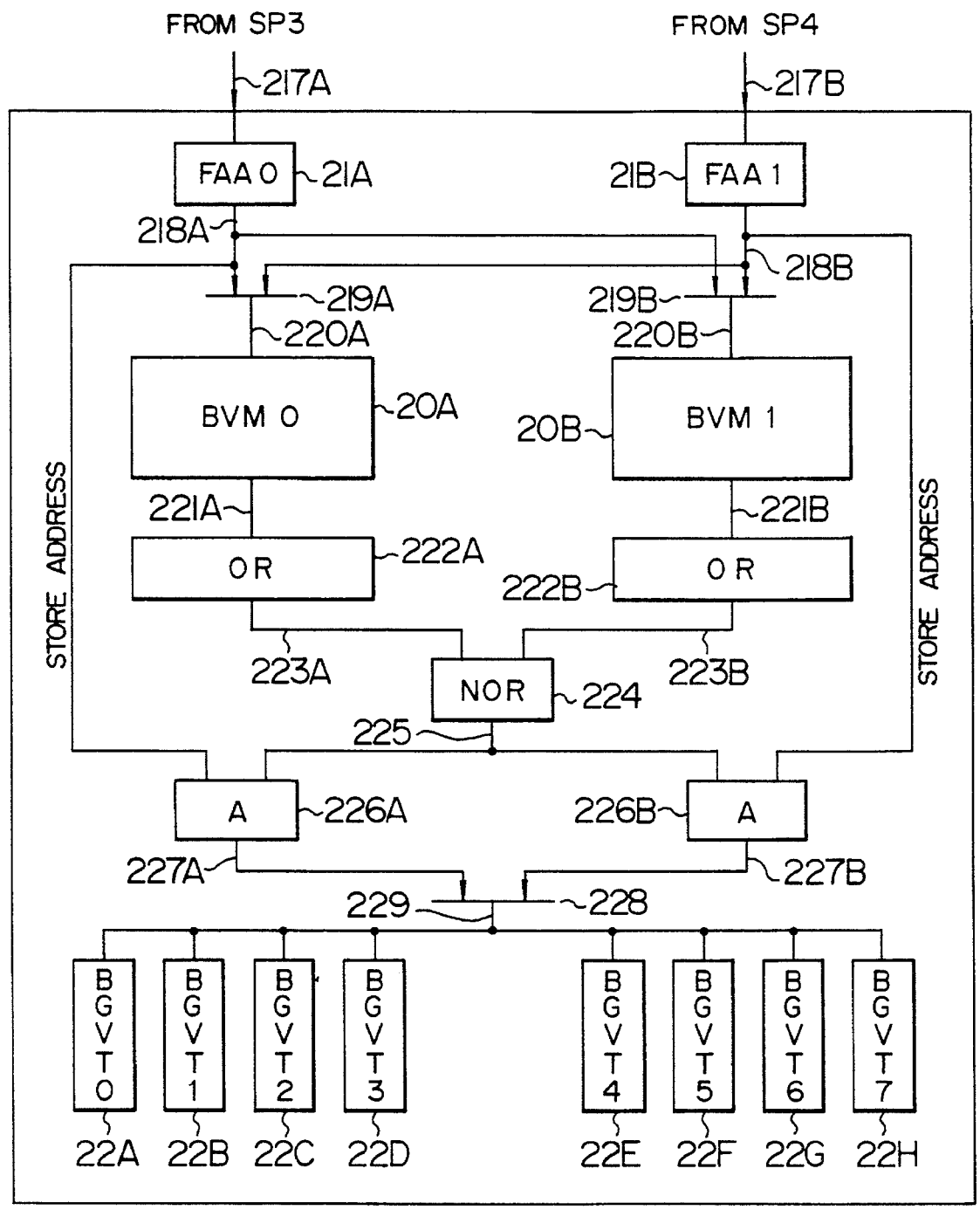
FIG. 4 illustrates an operation of registration and invalidation of the BVM and the BGVT in FIG. 1.

FIG. 4 illustrates the registration/invalidation operation of the BVM and the BGV in FIG. 1.

The operation of registration and invalidation of the BV's of the BVM's 20A and 20B and the BGV's of the BGVT's 22A–22H is explained in detail with reference to FIG. 4.

When the FAA registration request (with a request address) 217A is issued from the SP 3, the registration operation is effected to the FAA 21A. Then, the BVM fetch request (with the request address) 218A is issued from the FAA 21A. The request 218A is supplied to the selectors 219A and 219B and they are used as the selected requests 220A and 220B in the selectors 219A and 219B and supplied to the BVM's 20A and 20B. The BVM's 20A and 20B read all entries of the block group including the request addresses of the registration requests. In the present embodiment, the BV's of the 8192 entries are read.

Then, the BVM registration request 218A is issued. The request 218A is supplied to the selector 219A, and the request 220A selected by the selector 219A is supplied to the BVM 20A. The BVM 20A registers the valid bit, that is, sets the BV to "1" for the entry of the block including the request address of the registration request.

The BV's 221A and 221B of the 8192 entries read by the read operation from the BVM's 20A and 20B are supplied to the OR circuits 222A and 222B. The outputs 223A and 223B of the OR circuits 222A and 222B are logically NORed by the NOR circuit 224, if the output 225 of the NOR circuit 224 is logical "1", that is, if all BV's of the block groups including the registration request addresses of the BVM's 20A and 20B are "0" and the BGV prior to the acceptance of the current registration request is "0", it is necessary to register the BGV for the BGVT's 22A–22H. The output 225 of the NOR circuit 224 is supplied to the AND circuit 226A. When the output 225 is logical "1", the AND circuit 226A is activated so that the store request (with the request address) from the FAA) is used as the BGVT registration request (with the request address) 227A. The BGVT registration request 227A is supplied to the selector 228, and the request (with the request address) 229 selected by the selector 228 is supplied to the BGVT's 22A–22H. The valid bit is registered, that is, the BGV is set to "1" for the entry of the block group including the registration request address.

When the output 225 of the NOR circuit 224 is logical "0", that is, when one of the BV's of the block groups including the request addresses of the registration requests of the BVM's 20A and 20B is "1" and the BGV was "1" prior to the acceptance of the current registration request, it is not necessary to register the BGV for the BGVT's 22A–22H. When the output 225 of the NOR circuit 224 is logical "0", the AND circuit 226A is not activated and the BGVT registration request 227A is not issued.

When the FAA registration request (with the request address) 217B is issued from the SP 4, the same process as that described above is performed.

The operation performed when the FAA invalidation request is issued from the SP 4 is explained.

When the FAA invalidation request (with the request address) 217B is issued from the SP 4, the invalidation operation is first effected to the FAA 21B. Then, the BVM invalidation request (with the request address) 218B is issued from the FAA 21B. This request is supplied to the selector 219B, and the request (with the request address) 220B selected by the selector 219B is supplied to the BVM 20B. The BVM 20B invalidates the entry of the block including the request address of the invalidation request, that is, it resets the BV to "0". Then, the BVM fetch request (with the request address) is issued. This request is supplied to the selectors 219A and 219B, and the requests (with the request addresses) 220A and 220B selected by the selectors 219A and 219B are supplied to the BVM's 20A and 20B, respectively. The BVM's 20A and 20B read all entries of the block groups including the invalidation request addresses. The BV's 221A and 221B of the 8192 entries are supplied to the OR circuits 222A and 222B, respectively. The outputs of the OR circuits 223A and 223B are supplied to the NOR circuit 224. When the output 225 of the NOR circuit 224 is logical "1", that is, when all BV's of the block groups including the request addresses of the invalidation requests of the BVM's 20A and 20B are "0" and the BV's of all BVM's in that group have been set to "0" by the current invalidation process, it is necessary to reset the BGV's of the BGVT's 22A–22H to "0". The output 225 of the NOR circuit 224 is supplied to the AND circuit 226B. When the output 225 is logical "1", the AND circuit 226B is activated to issue the BGVT invalidation request (with the request address) 227B.

The BGVT invalidation request (with the request address) 227B is supplied to the selector 228, and the request (with the request address) 229 selected by the selector 228 is supplied to the BGVT's 22A–22H to invalidate the entry of the block group including the request address of the invalidation request, that is, reset the BGV to "0".

When the output 225 of the NOR circuit 224 is logical "0", that is, when one of the BV's of the block group including the request addresses of the invalidation requests of the BVM's and 20B is "1" and BV=1 is present in the BVM entry corresponding to that block group after the handling of the current invalidation request, it is not necessary to reset the BGV's of the BGVT's 22A–22H to "0". When the output 225 of the NOR circuit 224 is logical "0", the AND circuit 226B is not activated and the BGVT invalidation request 227B is not issued.

When the FAA invalidation request 217A is issued from the SP 3, the process is same as that described above.

Second Embodiment

In the second embodiment, the BVM in the first embodiment is shared by a plurality of SP's 3 and 4.

In the present embodiment, the registration status of the FAA of each SP is reflected to one BVM.

In the present embodiment, in the store operation from one VP, the BGVT and the BVM as required are searched as they are done in the first embodiment. If the BVM hits as a result of search, the search is performed for the FAA's of the SP's 3 and 4. In the previous embodiment, the BVM's and the FAA's are in one-to-one correspondence. Thus, if there is a hit in the BTM, there always is a hit in the corresponding FAA. The FAA is searched due to the configuration of the system. On the other hand, in the present embodiment, if there is a hit in the BVM, it is not known in which one of the FAA's a hit will occur. Accordingly, it is necessary to search both FAA's to determine in which FAA the hit occurs.

In the present embodiment, in the invalidation process of the BS of other SP associated with the store operation from one SP, if it is detected that the block to be stored had been stored in the BS of the SP which issued the store request, it is determined that said block has been stored in the BS of at least one SP even if the BS of the other SP is invalidated, and the BVM and the BGVT are not reset (BV, BGV). If said block is not stored in the BS of the SP which issued the store request but it is stored in the BS of the other SP, the reset process for the BVM and the BGVT of said block is started.

In the registration process to the FAA associated with the write operation of the block from one SP to the BS, if it is detected that the old block which is to be purged by the registration and the new block to be added are stored in the BS of the other SP, it is determined that said block is stored in the BS of at least one SP even if the registered content of the FAA of the one SP is modified. Thus, the BVM and the BGVT are not updated. By the collective reference control of the FAA's corresponding to the SP's, the integrity of the contents of the BAA (FAA) and the BVM/BGVT is assured even if the BS's of the SP's share the BVM.

When it is required to invalidate all contents of the BS of one SP as a post-process when the system has failed, not only the BS of that SP but also the BS's of other SP's are invalidated and the BVM.BGVT's are reset (BV.BVG) so that the integrity of the contents of the BAA (FAA) and the BVM.BGVT is assured.

The second embodiment is now explained with reference to the drawings.

Figure 5:
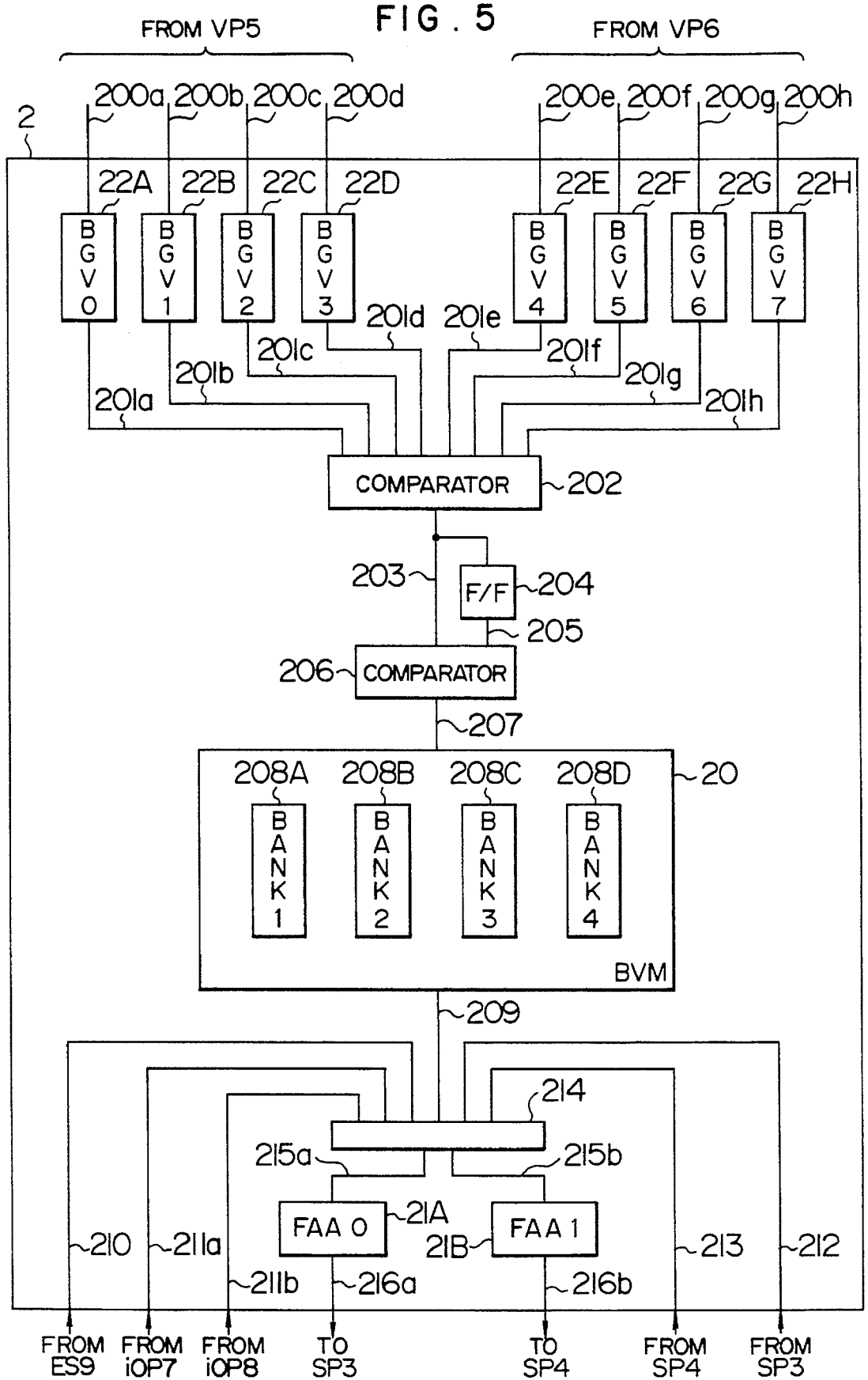
FIG. 5 illustrates an operation of the BGVT and the BVM when a store request of the VP is issued in a second embodiment.

In FIG. 5, the like numerals to those shown in FIG. 3 designate the like elements.

The relationship among the addresses of the MS, BGVT, BVM, FAA, BAA and BS is same as that shown in FIG. 2.

As shown in FIG. 5, a plurality of SP's are provided while only one BVM is provided.

In FIG. 5, when a store request (with the store address) is issued from the VP, the operations of the BGVT's 22A–22H, the compare circuit 202, the flip-flop 204 and the compare circuit 206 are the same as those explained in connection with FIG. 3.

Like the BVM's 20A and 20B described above, the BVM 20 is a memory which has a one-bit BV for each block of the BS. It comprises $2^{24}$ entries. The BVM 20 corresponds to the BS 31 in the SP 3 and the BS 41 in the SP 4. The BV which corresponds to a valid block in the BS 31 or the BS 41 is set to "1". Since the BVM 20 is of larger capacity than the BGVT's 22A–22H, it comprises memories which are of higher capacity and lower speed than the BGVT's 22A–22H. Thus, the BVM 20 is interleaved in four banks 208A–208D so that the requests to the BVM are continuously processed. When a request (with the store address) 207 to the BVM 20 is issued, the BVM 20 reads the BV of the entry corresponding to the request address. If the BV is "1", that is if the data of the BS 31 or 41 is to be rewritten by the store request, a request (with the store address) 209 to the FAA's 21A and 21B is issued. On the other hand, if the BV is "0", that is if the data of the BS 31 or 41 is not to be rewritten by the store request, the request (with the store address) 209 to the FAA's 21A and 21B is not issued and the process is terminated. The request (with the store address) 209 from the BVM 20 is supplied to the selector 214 together with the store request 210 (with the store address) from the ES 9, the store requests (with the store addresses) 211a and 211b from the IOP's 7 and 8, and the store requests (with the store addresses) 212 and 213 from the SP's 3 and 4. The selector 214 prioritizes the requests, and the selected requests (with the store addresses) 215a and 215b access the FAA's 21A and 21B. The FAA's 21A and 21B check the store addresses of the store requests selected by the selector 214, and if the store address matches to the address of the data registered in the BS 31 or 41, that is, if the data of the BS 31 or 41 is to be rewritten by the store request, an invalidation request 216a or 216b for the entry of the BS is issued the SP 3 or 4.

Figure 6:
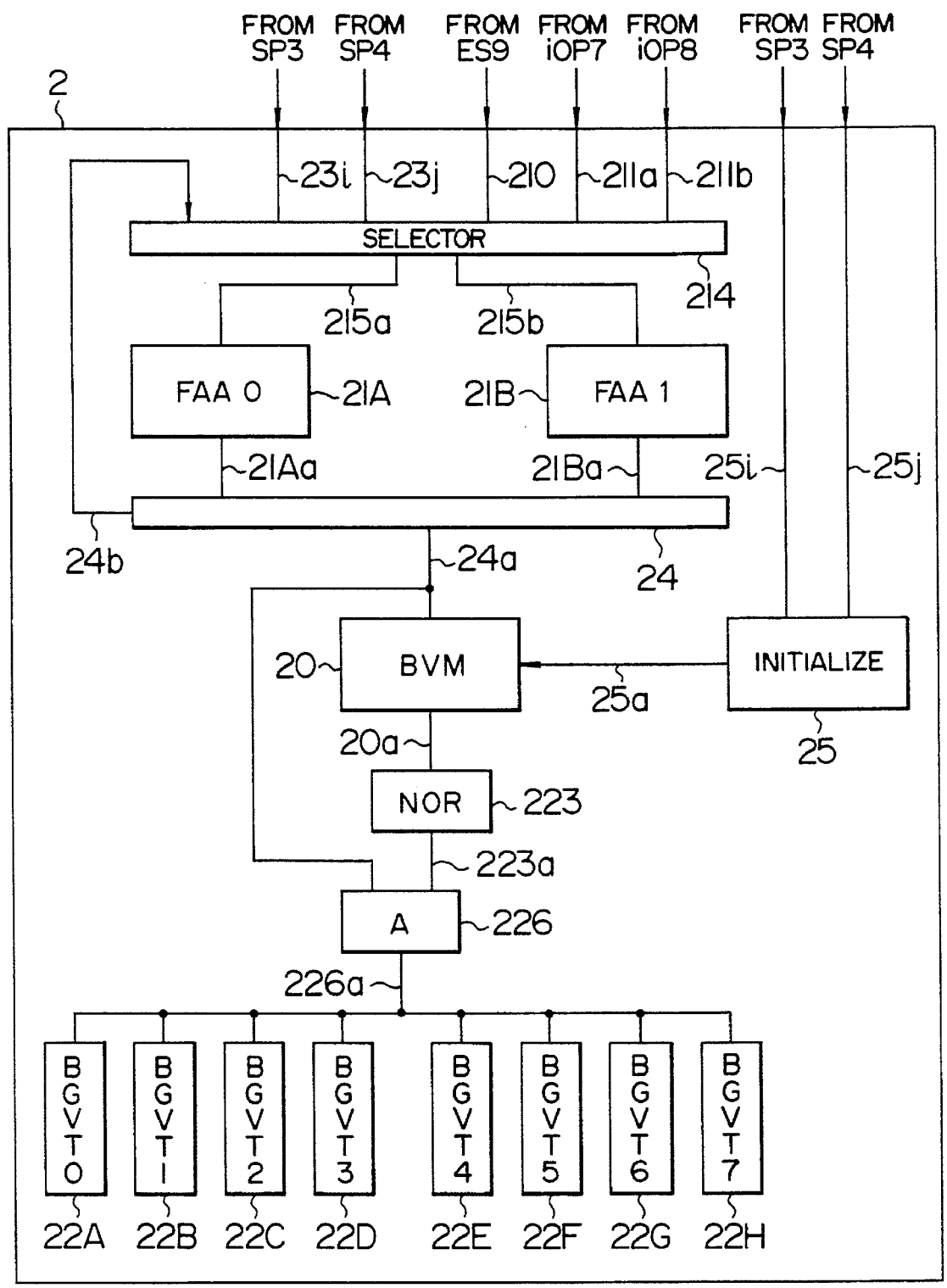
FIG. 6 illustrates an operation of the registration and the invalidation of the BVM and the BGVT in the second embodiment.

FIG. 6 illustrates the operation of registration/invalidation of the BVM and the BGVT in FIG. 5.

The operation of registration/invalidation of the BV of the BVM 20 and the BGV's of the BGVT's 22A–22H is now explained in detail with reference to FIG. 6.

When an FAA registration request (with the request address) 23i is issued from the SP 3, the address of the old block which will be purged by the registration is read from the FAA 21A, and it is sent to the selector 214 from the discrimination circuit 24 through the signal line 24b. The registration operation is done for the FAA 21A and the check for the registration of the block to be purged, sent via the signal line 24b is done for the FAA 21B, in parallel. If it is detected that the block to be purged by the registration has not been registered in the BS 41 of the SP 4, that is, if it is detected that the block will not be present in any of the BS's 31 and 41 after the purge, an invalidation request (with the request address) 24a is issued to the BVM 20.

The process of issuing the request to the BVM 20 when the FAA registration request (with the request address) 238 is issued from the SP 4 is same as the process described above.

When the FAA invalidation requests (with the request addresses) 211a, 211b and 210 are sent to the MS 1 from the IOP's 7 and 8 and the ES 9 by the store request, they are sent to the FAA's 21A and 21B through the selector 214. The FAA's 21A and 21B are searched by the request addresses of the invalidation requests, and if the discrimination circuit 24 detects that the block including that request address has been registered in the BS 31 or 41, the entry of the FAA is invalidated and the invalidation request (with the request address) 24a is issued to the BVM 20.

When the invalidation request (with the request address) 23i for the FAA 21A is sent by the store request to the MS 1 from the SP 3, the FAA's 21A and 21B are searched by the request address. If the discrimination circuit detects that the block including that address has been registered in the BS (BS 41) of the SP (SP 4) other than the SP (SP 3) which has issued the invalidation request for the FAA and that the block including that address has not been registered in the BS (BS 31) of the SP (SP 3) which has issued the invalidation request for the FAA, the FAA 21A is invalidated and the invalidation request (with the request address) 24a is issued to the BVM 20. If it is detected that the blocks including the request address of the invalidation request have been registered in the BS's 31 and 41, the FAA 21B for the BS 41 is invalidated but no request to the BVM 20 is issued, because that block is kept registered in the BS 31 even if the BS 41 is invalidated, and hence the BVM 20 need not be updated.

The process of issuing the request to the BVM 20 when the invalidation request is issued from the SP 4 to the FAA is same as that described above.

When the registration request (with the request address) is issued to the BVM 20, it is received by the BVM 20 and the BV's of all entries ($2^{13}$ entries) of the block group which includes the request address of the registration request are read. Then, the BV is set to "1" for the entry of the block which includes the request address of the registration request. In parallel to the above process, the BV's 20a of the $2^{13}$ entries read in the previous read cycle are supplied to the NOR circuit 223. If the output 223a of the NOR circuit 223 is "1", that is, if all BV's of the block group which includes the request address of the registration request are "0", and the BGV prior to the acceptance of the current registration request is "0", it is necessary to register the BGV to the BGVT's 22A–22H. The output 223a of the NOR circuit 223 is supplied to the AND circuit 226. When the output 223a is "1", the AND circuit 226 is activated and the registration request (with the request address) is used as the BGVT registration request (with the request address) 226a. The BGVT registration request (with the request address) are supplied to the BGVT's 22A to 22H. The BGV is set to "1" for the entry of the block group which includes the request address. If the output 223a of the NOR circuit 223 is "0", that is, if one of the BV's of the block group which includes the request address of the registration request of the BVM 20 is "1" and the BGV has been "1" prior to the acceptance of the current registration request, it is not necessary to register the BGV to the BGVT's 20A–20H. If the output 223a of the NOR circuit 223 is "0", the AND circuit 226 is not activated and the BGVT registration request 226a is not issued.

On the other hand, when the invalidation request (with the request address) 24a is issued to the BVM 20, it is received by the BVM 20 and the entry of the block which includes the request address of the invalidation request is invalidated, that is, the BV is reset to "0". Then, all entries of the block groups which include the invalidation address are read from the BVM 20. The BV's 20a of the $2^{13}$ entries thus read are supplied to the NOR circuit 223. If the output 223a of the NOR circuit 223, is "1", that is, if all BV's of the block groups which include the request address of the invalidation request for the BVM 20 are "0" and the BV in the block group is rendered "0" by the current invalidation process, it is necessary to reset the BGV's of the BGVT's 22A–22H to "0". The output 223a of the NOR circuit 223 is supplied to the AND circuit 226. When the output 223a is "1", the AND circuit 226 is activated and the BGVT invalidation request (with the request address) 226a is issued. The BGVT invalidation request 226a is supplied to the BGVT's 22A–22H so that the entries of the block group which includes the request address of the invalidation request are invalidated, that is, the BGV's are reset to "0". If the output 223a of the NOR circuit 223 is "0", that is, if one of the BV's of the block groups which include the request address of the invalidation request is "1" and there is an entry having BV="1" in the BVM and corresponding to that block group after the processing of the current invalidation request, it is not necessary to reset the BGV of the BGVT's 22A–22H to "0". If the output 223a of the NOR circuit 223 is "0", the AND circuit 226 is not activated and the BGVT invalidation request 26a is not issued.

Where the multiprocessor system fails, it may be necessary to invalidate all BS's of one SP. In this case, it is necessary to invalidate not only the FAA's corresponding to the BS's but also the BVM.BGVT's. Where the BVM.BGVT's are to be invalidated, it is necessary to invalidate all BS's of other SP's which share the BVM.BGVT's. When the initialization circuit 25 receives the total invalidation requests (with the request addresses) 25i and 25j for the BVM.BGVT's from the SP's 3 and 4, it issues the request (with the request address) 25a to the BVM 20 to reset the BV's from the entry 0 to the last entry of the BVM to "0". The BVM 20 is entirely invalidated by the request 25a, and the BGV invalidation request is issued to the BGVT so that the BGVT is entirely invalidated. The total invalidation request for the BS's between the SP's is transmitted between the SP's by an interface (not shown) so that all BS's are invalidated. In this case, the BS's of the SP's which constitute the multi-processor are grouped and each group is controlled by the BSV. The BV of the BVM is controlled depending on whether a block has been registered in one of the BS's which belong to the same group so that the registration of the blocks in the BS's of different groups is not affected. In this case, it is necessary that the BGVT has the table corresponding to each BVM.

We claim:

1. A multi-processing system with a main storage which is common to a plurality of processor means, each processor means having a buffer storage, the system comprising:

the main storage comprising a plurality of blocks;

a plurality of block valid memories, each corresponding to a different one of the buffer storages, and each having at least one valid bit, the valid bit of each block valid memory corresponding to a one block of the main storage and being representative of whether the corresponding one block is stored in a buffer storage which corresponds to a one of the plurality of block valid memories;

means for detecting whether the valid bit of the one block valid memory corresponding to the one block is valid;

means for precluding access to the buffer storage corresponding to the one block valid memory when said detecting means detects that the valid bit is invalid;

means for accessing the buffer storage corresponding to the one block valid memory when said detecting means detects that the valid bit is valid to facilitate control for invalidating the block stored in the corresponding buffer storage; and, a block group valid table (BGVT) having at least one group valid bit, the group valid bit corresponding to a block group comprising a predetermined number of blocks, and the group valid bit indicating whether at least one of a plurality of valid bits of block valid memories corresponding to the predetermined number of blocks contained in the block group is valid wherein all of the plurality of blocks belong to a corresponding block group and each group valid bit is provided for a different one of all block groups, said block group valid table being provided for each of said plurality of processor means so that each of said processor means can reference a corresponding BGVT at first when a store access from said each processor means to said main storage occurs, and that said each processor means can reference said block valid memories only in a case where reference to the corresponding BGVT by said each processor means is hit.

2. The multi-processing system according to claim 1, wherein said plurality of block valid memories are interleaved in a plurality of banks.

3. The multi-processing system according to claim 1, wherein each of said plurality of block valid memories includes a reducing circuit at an input thereof for reducing requests having a plurality of continuous store addresses contained in a same block into one request.

4. The multi-processing system according to claim 3, wherein said reducing circuit includes means for reducing requests having a plurality of store addresses into one request when there are a plurality of requests having store addresses included in the same block.

5. The multi-processing system according to claim 3, wherein said reducing circuit includes means for reducing requests into one request when the requests having a plurality of continuous store addresses are included in the same block.

6. The multi-processing system according to claim 1, further comprising means for referring to the block group valid table before referring to the plurality of block valid memories when the processor issues a request with a store address, and means for withdrawing reference to the plurality of block valid memories in the case where a selected group valid bit corresponding to the store address represents a negative.

7. A memory control system, including a main memory, a scalar processing unit and at least one vector processing unit, for data processing, the system comprising:

a buffer memory for reading-out and writing-in a copy of an information block included in the main memory;

a buffer address array, coupled to the main memory, for storing therein a store address of the main memory which corresponds to the copy of the information block stored in the buffer memory;

first detector means, coupled to the buffer address array, for detecting whether the store address of data is held in the buffer address array when the scalar processing unit stores the data in the main memory;

a front address array, coupled to the main memory, for storing therein a copy of contents of the buffer address array;

second detector means, coupled to the front address array, for detecting whether the store address of data is held in the front address array when the at least one vector processing unit stores the data in the main memory;

means for invalidating block information in the buffer memory, the block information included in that information which is written into the main memory by the at least one vector processing unit;

a block valid memory, having a plurality of valid bits, each valid bit corresponding to one of a plurality of blocks into which the main storage is divided and which contain the block information, and each valid bit indicating whether a copy of a corresponding information block is stored in the buffer memory wherein each valid bit is provided for a different one of the plurality of blocks;

means responsive to the writing of information into a selected block of the main memory by the at least one vector processing unit for reading a valid bit corresponding to the selected block from the block valid memory; and, means for accessing the block valid memory by the at least one vector processing unit prior to accessing the front address array, so as to allow access to said front address array when the corresponding valid bit in the block valid memory is valid, but preclude access to said front address array when the corresponding valid bit in the block valid memory is invalid.

8. The memory control system according to claim 7, further comprising a block group valid table having a plurality of group valid bits each corresponding to a block group consisting of a predetermined number of blocks, each group valid bit being representative of whether or not at least one of the valid bits corresponding to the blocks contained in a corresponding block group is valid wherein all of the plurality of blocks belong to a corresponding block group and each group valid bit is provided for a different one of all block groups.

9. The memory control system according to claim 7, wherein said block valid memory includes a circuit and an input thereof for reducing requests having a plurality of continuous store addresses contained in a same block into one request.

10. A memory control system, including a main memory, a plurality of scalar processing units, and at least one vector processing unit, the system comprising:

each scalar processing unit including a buffer memory for storing a copy of information of the main memory, a buffer address array for holding a store address of the information of which the copy is stored in the buffer memory, and first detector means for detecting whether the store address of data is held in the buffer address array when the scalar processing unit stores data in the main memory;

a plurality of front address arrays, each assigned to one of the scalar processing units respectively for storing a copy of contents of a one buffer address array contained in the one scalar processing unit;

a plurality of second detector means, coupled to the plurality of front address arrays respectively, for detecting whether the store address of data is held in the plurality of front address arrays when the at least one vector processing unit stores data in the main memory;

a plurality of means, coupled to the plurality of second detector means respectively, for invalidating a block information in a corresponding buffer memory, the block information included in that information which is written into the main memory by the at least one vector processing unit;

a block valid memory, common to the plurality of scalar processing units, having a plurality of valid bits each corresponding to one of a plurality of blocks into which the main memory is divided and which contains block information, each valid bit indicating whether a copy of a corresponding information block is stored in the buffer memory wherein each valid bit is provided for a different one of the plurality of blocks;

means responsive to the writing of information into a selected block of the main memory by the at least one vector processing unit for reading a valid bit corresponding to the selected block that is positive from the block valid memory prior to accessing any of the plurality of front address arrays wherein the plurality of front address arrays need not be referenced if the valid bit is negative; and means for activating all of the second detection means only when the read-out valid bit represents positive.

11. The memory control system according to claim 10, further comprising a block group valid table having a plurality of group valid bits each corresponding to a block group comprising a predetermined number of blocks, each group valid bit indicating whether at least one of the valid bits corresponding to a block group is valid and wherein all of the plurality of blocks belong to a block group and each group valid bit is provided for a different one of all block groups.

12. The memory control system according to claim 11, further comprising a reducing circuit including means for reducing requests having a plurality of store addresses into one request when there are a plurality of requests having store addresses included in a same block.

13. The memory control system according to claim 11, further comprising a reducing circuit including means for reducing requests into one request when the requests having a plurality of continuous store addresses are included in a same block.

14. A multi-processor system including scalar processors and vector processors, the system comprising:

a main storage comprising a plurality of block groups, each block group comprising a plurality of blocks;

a buffer storage means, corresponding to each scalar processor, for storing therein at least one of the plurality of blocks concurrently with the main storage;

a vector processor request means for requesting a store operation to a selected block of a selected block group from a vector processor to the main storage;

a block group valid table corresponding to the vector processor request means for storing group information representing the plurality of block groups of the main storage and indicating whether any block of the selected block group is stored in the buffer storage means;

a block valid memory for storing block information representing the plurality of blocks of the main storage and indicating whether the selected block is stored in the buffer storage means; and, detection means for detecting whether the group information indicates that any block of the selected block group is stored in the buffer storage means and whether the block information indicates that the selected block is stored in the buffer storage means so that if the detection means detects that the selected block is not stored in the buffer storage means, then the buffer storage means can be by-passed during the store operation thereby increasing processing efficiency.

15. A method for effecting matching control between a main storage and a buffer storage in a multi-processor system including the main storage comprising block groups, each block group comprising blocks, a scalar processor including the buffer storage and a buffer address array, a front address array which stores information of the buffer address array, a block valid memory which stores information indicating whether a block of the main storage is also stored in the buffer storage, a block valid group table which stores information indicating whether any block of a block group is stored in the buffer storage, a vector processor, a first detector, and a second detector, the method comprising steps of:

requesting a store operation to a store address location in a selected block of a selected block group from the vector processor to the main storage by the vector processor;

first detecting, by the first detector, whether any block of the selected block group is stored in the buffer storage;

second detecting, by the second detector, whether the selected block of the selected block group is stored in the buffer storage if the first detector detects that any block of the selected block group is stored in the buffer storage;

accessing the front address array to determine whether a content of the store address location is present in the buffer storage, the accessing occurring only if the first and second detecting make positive determinations; and;

performing the store operation to the main storage and invalidating the selected block in the buffer storage in accordance with the positive determinations of the first detecting and the second detecting that the selected block is stored in the buffer storage and a determination of the accessing of the front address array that the content of the store address location is present in the buffer storage.

* * * * *